US00RE34506E

United States Patent [19]

Dobbin et al.

[11] E Patent Number: Re. 34,506

[45] Reissued Date of Patent: Jan. 11, 1994

[54] PRODUCT AND PROCESS FOR MANUFACTURING AN OPTICAL DISC MASTER

[75] Inventors: Robert B. Dobbin; David G. Loeppky, both of Irvine, Calif.; James R. Norton, Mineola, Kans.; Bruce E. Del Mar, Laguna Beach, Calif.

[73] Assignee: Del Mar Avionics, Irvine, Calif.

[21] Appl. No.: 965,155

[22] Filed: Oct. 22, 1992

Related U.S. Patent Documents

Reissue of:

[64] Patent No.: 5,099,469
Issued: Mar. 24, 1992
Appl. No.: 482,033
Filed: Feb. 20, 1990

[51] Int. Cl.[5] ..... G11B 7/00

[52] U.S. Cl. ..... 369/58; 264/1.1; 254/2.7; 369/283; 369/286

[58] Field of Search ..... 264/1.1, 2.7; 430/269, 430/321, 495; 369/54, 58, 100, 280, 283, 284, 286, 109, 272, 275.1, 275.2; 346/76 L, 135.1

[56] References Cited

U.S. PATENT DOCUMENTS 4,430,401 2/1984 Wilkinson .
4,619,804 10/1986 Leonard et al. ..... 264/1.3 X
5,119,359 6/1992 Miyagi et al. ..... 369/109

OTHER PUBLICATIONS

Richard L. Wilkinson, CD Quality Control:Quality Starts at Mastering, 1992, The Entire Document.

*Primary Examiner*—Robert L. Richardson
*Attorney, Agent, or Firm*—James D. Leimbach; W. D. English

[57] ABSTRACT

The invention discloses a simplified four step process for making an optical disc master or alternatively a WORM disc by first making or obtaining a transparent polymer disc with a tracking groove of desired geometry molded therein, then spin coating an optically active lamina on the grooved side of the disc, then recording data on said polymer disc with groove controlled and tracked laser means by ablating active lamina, forming pits, the shape of which is determined by the groove geometry and finally depositing a conductive and reflective lamina over the pitted active lamina. To change the OD master to an OD WORM, a protective cover is added to the electrically conductive and optically reflective lamina.

45 Claims, 4 Drawing Sheets

PRODUCT AND PROCESS FOR MANUFACTURING AN OPTICAL DISC MASTER

Matter enclosed in heavy brackets [ ] appears in the original patent but forms no part of this reissue specification; matter printed in italics indicates the additions made by reissue.

BACKGROUND OF THE NVENTION

1. Field of the Invention

This invention relates to a process for manufacture of an optical disc (OD) master on which data is recorded and from which an OD stamper may be made by conventional electroforming means for mass duplication of many OD's identical to the master, and which process may be alternatively used to make a Write Once Read Many (WORM) OD for test and validation of systems for backup archieval of data, or for general production of recorded OD's.

2. Description of the Prior Art

An OD master which may also include a compact disc (CD) master, is an article from which essentially all prerecorded mass produced consumer OD's are subsequently molded. Indeed, the OD master is a master mold for a stamper which produces many OD's. The master is the first article in the OD manufacturing process that presents data or information on a disc or platter that one can read by optical means and from which copies may be made. All subsequent OD manufacturing and duplication processors or operations transfer that identical form, format and data from one article or disc to the next by various means, to include vacuum deposition, electroforming/plating, or injection molding processes. Prior to making the OD master, data or information would conventionally be recorded on tape or other storage devices, from which the data is transformed to the OD master by optical means for mass duplication thereof.

Past techniques for producing a master combined existing technologies from various industries. The most prominent of these techniques is the photo resist concept of the semiconductor industry. The master, and subsequently molded and duplicated OD's, comprise a series of its describing optically recorded information that lay on an actual or imagined spiral line or track that starts at an inner radius near the center of the disc and continues to an outer radius near the periphery of the disc. Conventionally, the pits are approximately 0.6 $\mu$m wide, 0.9 to 3.3 $\mu$m long, 0.12 $\mu$m deep, and are separated from neighboring tracks on either side thereof by 1.6 $\mu$m ($10^{-6}$ meters).

To accomplish the above format, the photoresist technique commonly used in the semiconductor industry was used. By such method, a lamina of photoresist material is traditionally spin coated upon a very smooth, polished circular plate of glass. The glass plate with photoresist lamina is then placed in an oven to cure the photo resist. The photoresist coated, glass plate is next set upon a turntable which is caused to spin at a variably decreasing rate of speed to yield a constant linear velocity (CLV) of approximately 1.2 meters per sec for a point in the surface of the glass plate traveling radially outward from the center of the plate. In such systems a data modulated laser is set immediately above the glass plate and is suspended by a relatively large and complex translational mechanism to cause the laser to very gradually, and at a steady radial rate, move outwardly from the center of the spinning glass plate while concomitantly radiating the surface of the plate which in effect produces a spiral track of data in the photo resist material. This process is referred to as mastering. What happens is that the areas designated to become pits are exposed to laser light along the spiral path as the plate rotates. After all data is recorded in the photoresist lamina on the glass plate, the plate is placed in at least one bath of developing solution, typically a multistep process, where the exposed areas in the photoresist are etched out leaving a series of pits. The glass plate with etched photoresist is then oven dried, followed by metalization of the photoresist lamina by vacuum deposition of a thin conductive lamina of metal thereon, which yields the desired master. The master is finally subjected to an analysis and validation process prior to electroforming to make a stamper and replication.

The foregoing type of mastering system is quite expensive in terms of capital equipment involved, labor, space, sensitivity to motion and shock, time and costs. Operating costs to produce a single master can be relatively expensive.

As an alternative to the photoresist mastering system, another technique evolved which incorporates the use of a material which undergoes ablation when exposed to a laser thereby forming the desired pit. This process brought forth a number of advantages over the photoresist process, including a reduction in the process steps by eliminating, among others, developing and curing steps, which results in a less costly procedure and much shorter completion time, and the ability to monitor the quality of the disc concurrent with the mastering process of recording data thereon.

This mastering process, known as non-photo resist (NPR), utilizes what is referred to as a dry process formula (DPF) photoreactive coating. In this case, a unique material which needs no oven-curing, developing or drying procedures, is spin coated upon a glass plate disc. The plate and DPF material are then set upon a turntable for mastering and concomitant analysis. The laser creates pits in real time by ablation permitting simultaneous direct read after write (DRAW) for analysis of error rate and conformance to standards. Metalization of the pitted layer is conducted to complete the mastering process. Once such a master is made, conventional electroplating and replication processes are accomplished to make a stamper which is then used for mass duplication of OD's by conventional injection molding processes.

The NPR system makes some improvement over the prior art largely due to eliminating etching processing and oven-curing but it does not eliminate motion sensitivity nor the need for expensive and complex translator mechanisms and the glass reconditioning process. Capital expense for such systems is still substantial, and the cost to produce a single master is still relatively expensive.

Yet another mastering process is referred to as a direct metal mastering (DMM) process. In the DMM process, instead of using a laser to either expose or cause ablation of the surface material, a tiny diamond stylus actually engages the surface, usually metal, and gouges the pits. Although technically feasible, this concept has had no meaningful application in industry if for no other reason because the "no contact" laser systems offer inherent increased reliability, longevity and efficiency over mechanical systems.

Therfore, although satisfactory for intended purposes at the time, the prior art possess inherent limitations, and there continues to be a long standing need for a more efficient, less time consuming, and less expensive method for manufacture of an OD master. The invention disclosed herein does just that.

SUMMARY OF THE INVENTION

The invention is a process and associated equipment for manufacture of an OD master which may be used for production of an OD stamper for mass production of duplicated OD's or which process may alternatively be used to make an OD WORM disc. The invention conceives utilizing an optically transparent polymer disc having an optical tracking groove molded or etched with exacting dimensions on one side thereof. An optically active lamina is applied to the grooved surface of the disc by spin coating means in a clean room environment. The active lamina is then encoded with data in the form of variable length pits of dots and dashes by laser means configured such that the data modulated beam is finely focused from either side of the disc upon the active lamina while tracking along the spiral groove causing nearly total ablation of the active lamina to a desired bit pit geometry as dictated by the groove geometry. A very thin electrically conductive lamina is then deposited on the encoded active lamina yielding an OD master ready for electroforming processes to make a stamper which in turn will be used to mass duplicate the master. Alternatively, since the conductive lamina may also be reflective, the thus produced master may be converted to a WORM disc by simply adding a protective layer to the reflective lamina. In short, the disclosed process may be implemented to produce either on OD master or an OD WORM.

OBJECTS OF THE INVENTION

It is a primary object of the invention to make a simple, compact, relatively fast, inexpensive and efficient OD mastering system.

Another object of the invention is to provide a fast and inexpensive OD mastering process that will not only yield an OD master but also, with the addition of a single protective layer, will yield a WORM archieval or error checking and data validation disc.

Another object of the invention is to make an OD mastering system by novel application of a commercially available optical head and laser and pregrooved, optically transparent, inexpensive polymer substrate for optical beam tracking to avoid need of expensive capital equipment and the need for bulky, and complex arrays of custom optics, translation systems and expensive glass discs found in prior OD mastering systems.

Another object of the invention is to utilize a tracking groove of a defined and unique geometry such that a data modulated laser beam accurately focused upon and radiating the entire groove surface from either side of the disc will cause a spontaneous and nearly total ablation of the adjacent optically active layer thereby forming a data pit the contour and boundary of which is the substrate groove surface itself.

Yet another object of the invention is to lower operating expenses encountered in producing an OD master by use of easily made or available and inexpensive pregrooved polycarbonate discs thereby eliminating conventional expensive glass plate substrates which, although may be used over and over, require intensive cleaning and polishing procedures necessary to reclaim the glass. Still another object of the invention is to speed up the mastering process and decrease operation costs in OD mastering by eliminating several conventional steps, including traditional glass preparing, oven curing, developing and oven drying processes.

A further object of the invention is to simplify the OD mastering process thereby diminishing the number of skilled personnel necessary to accomplish the various routines of conventional mastering techniques.

Yet, a further object of the invention is to diminish the size, and number of peripheral OD mastering equipment components thereby decreasing the amount of space necessary for the mastering process and thus substantial curtailing cost.

Still a further object of the invention is to make a CD master and alternatively a CD WORM that can be recorded upon and read from either side of the disc.

These and further objects of the invention will become more readily apparent and obvious in view of the attached drawing, and description of a preferred embodiment, in light of the appended claims.

DETAILED DESCRIPTION OF A PREFERRED EMBODIMENT

Figure 1:
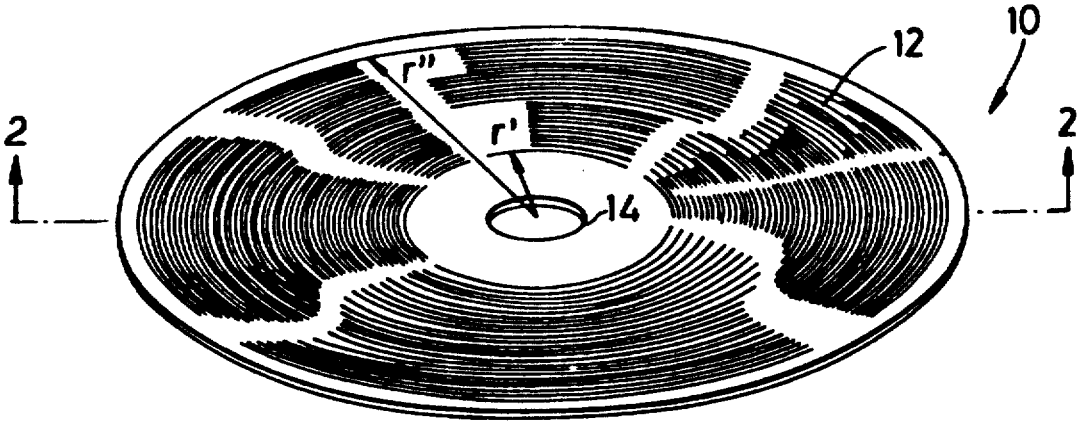
FIG. 1 illustrates an isometric view of a spiral grooved polymer disc used as a substrate in the invention with a first cross section 2 cutting the disc in half (Step 1).
Figure 2:
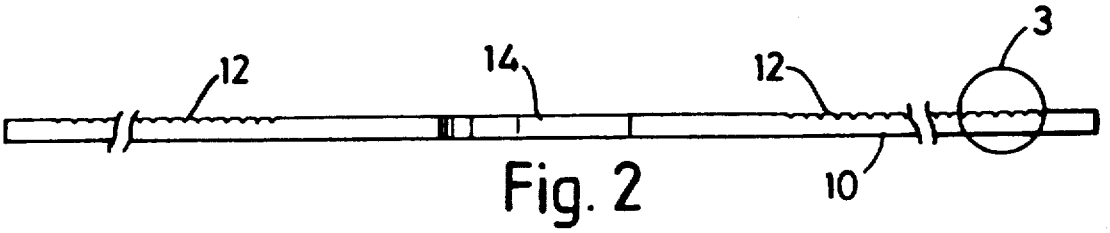
FIG. 2 illustrates the FIG. 1 cross section of the pregrooved polymer disc cut in half.
Figure 3:
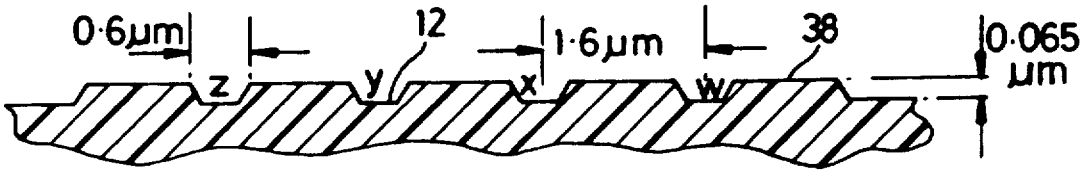
FIG. 3 illustrates a blown up section of FIG. 2 showing simplified groove detail and geometry.

The invention process disclosed herein delineates a new approach to existing OD mastering techniques. The first step of the process begins with making or obtaining a molded polymer disc substrate 10, conventionally approximately 1.2 mm thick and 130 mm in diameter though not limited thereto, as illustrated in FIG. 1, which has, as an integral part thereof, molded in or etched therein an optical tracking path which path is preferably a groove 12 and said disc further having a central spindle hole 14. The polymer disc substrate is preferably transparent polycarbonate but may likewise be transparent polymethylacrylate (PMMA) or any other similar transparent substrate capable of carrying a tracking path, and furthermore need not be transparent if laser recording beam action is to come from the top, i.e. grooved side of disc 10, rather than passing through the bottom, i.e. non-grooved side of disc 11 as is conventional and as described herein. Although not limited thereto, optical tracking groove 12 comprises a spiral track conventional in the art beginning at an inner radius r' and ending at an outer radius r''. A first cross section, cutting disc substrate 10 in half, is illustrated in FIG. 2, and a blowup of tracking groove 12 is illustrated in FIG. 3 for a clearer understanding of the preferred groove geometry.

Because groove geometry will ultimately determine the geometry of a pit or bit of information formed therein by ablation of the optically active lamina, it is necessary that the groove dimensinos be that of the desired pit. Dimensions of groove 12 in the preferred embodiment are nominally as indicated in FIG. 3 discounting the possibility of any nominal residual reactive lamina not ablated. Preferably, although not necessarily limited thereto, groove width is 0.6 μm, depth 0.065 μm, and the track pitch, i.e. the distance, including the "land" 38, between successive tracks or grooves, is 1.6 μ, which will yield an ablated pit, utilizing a 780 nm (laser of 5 to 15 mW power, of ⅛ to ¼ deep approximately 200 Å), 0.4 to 0.6 μwide, and from 0.9 to 3.3 μm long as desired.

Figure 4:
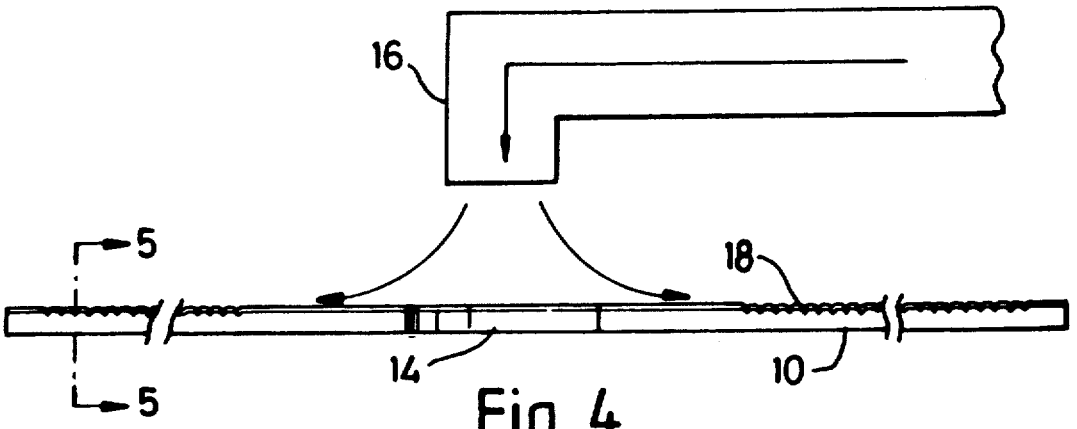
FIG. 4 illustrates spin coating an optically active 30 lamina (Step 2) and a second cross section 6.

The second step is illustrated in FIG. 4. The pregrooved optically transparent polycarbonate, disc substrate 10 is laminated by spin coating means 16 with a very thin lamina 19, approximately 0.13 μm thick of an optically active substance, which in the preferred embodiment is a solution of a dye polymer compound of nitrocellulose, dye sensitive to 780 nm wavelength of light.

Figure 5A:
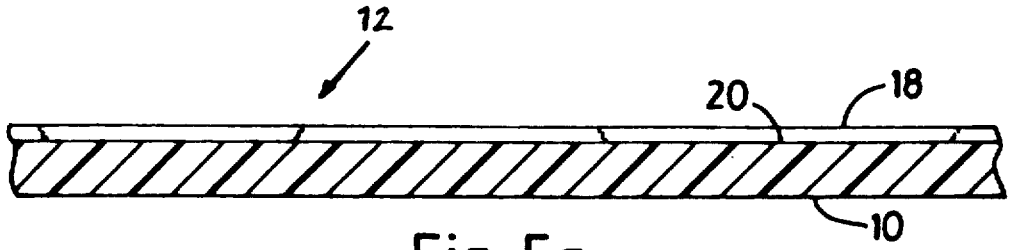
FIG. 5*a* illustrates the FIG. 4 cross section along a groove with the optically active lamina superimposed thereon.

FIG. 5*a*, as a cross section of FIG. 4, illustrates a longitudinal side view of a short strip or sector of a single tracking groove 12 on polycarbonate disc substrate 10 indicating optically active nitrocellulose lamina 18 superimposed upon the surface 20 of tracking groove 12.

Figure 5B:
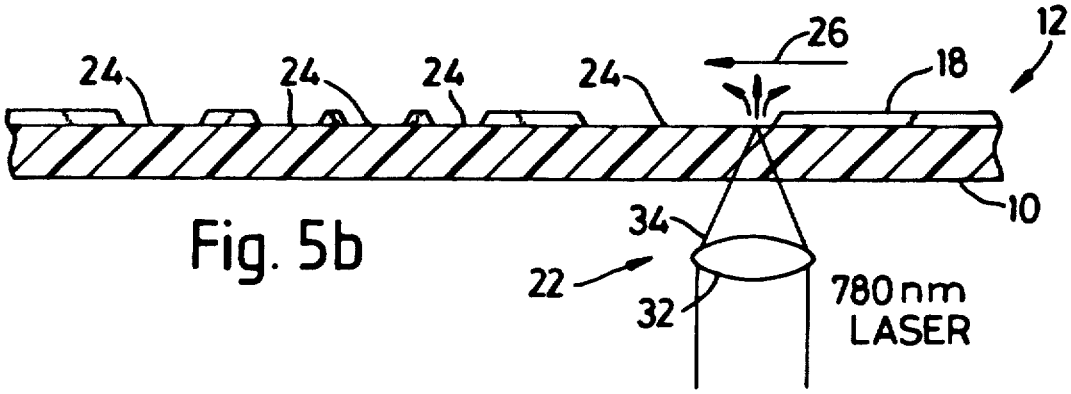
FIG. 5*b* illustrates the FIG. 4 cross section along a grove moving to the left depicting a stationary laser recording data by creating pits of nearly totally ablated optically active lamina (Step 3).

The third step of the mastering process is illustrated in FIG. 5*b*, which illustrates the data recording process. FIG. 5*b* illustrates data recording by means of a disc spinning above an optical head 22 with laser beam 34 passing through the transparent polycarbonate substrate 10 to irradiate upon the optically active lamina 18; however, it is equally feasible to place optical head 22 above the disc and radiate the active lamina 18 from above rather than below as is customary in the prior art, in which case it would not be necessary for substrate 10 to be transparent. However, placing laser 22 below the spinning disc 10 is preferred because ablated matter or other stray particulate matter settling upon the top surface of active lamina 19 is more likely than on the bottom surface of substrate 10, and furthermore particulate matter on the bottom of substrate 10 would not occlude active lamina 18 as would a particle on active lamina 18 itself because the relatively large laser beam 34 is focused through substrate 10 to a point of approximately a micron in diameter on the bottom surface 20 of groove 12 and the adjacent active lamina 18. In the preferred embodiment, however, a 780 nm laser source 22, situated below disc substrate 10, is caused to pass a finely focused laser beam 34 through disc substrate 10, focusing upon active lamina 18. The dye in active lamina 18 of the nitrocellulose compound absorbs light at 780 nm resulting in absorbency of substantial heat energy in lamina 18 which generates a rapid chemical reaction causing reactive lamina 18 to spontaneously decompose causing a nearly total ablation thereof to form pits 24. Laser source 22 appears stationary to tracking groove 12 upon which it is focused and tracked, yet groove 12 itself, as indicated by arrow 26, is moving relative to laser source 22 in FIG. 6, enabling a series of data to be recorded thereon. Laser head 22 actually moves radially outward in a straight line from the center to the periphery of disc 10 while tracking spiral groove 12 as disc 10 spins at a steadily declining rate to maintain a constant linear velocity (CLV) of approximately 1.2 meters per second for a point on the surface of the disc.

Figure 6:
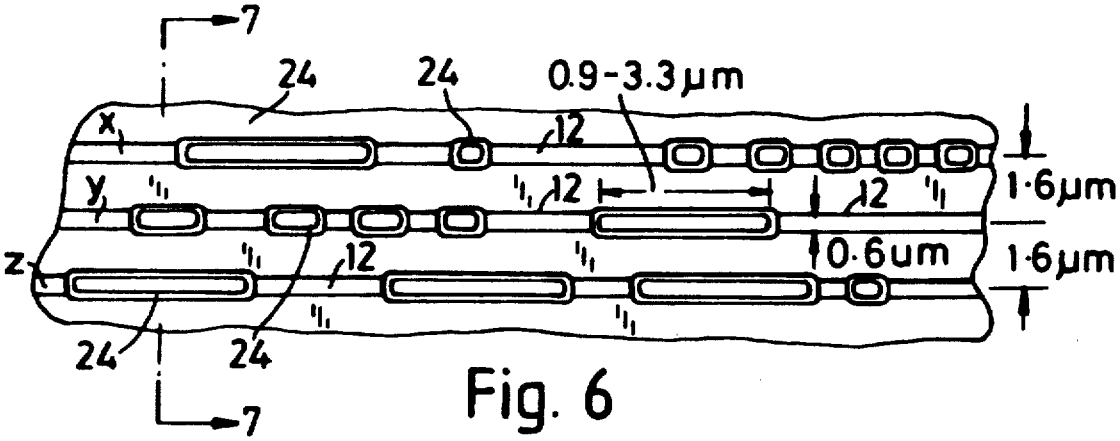
FIG. 6 illustrates a blown up top view of a sector of grooves of the disc illustrated in FIG. 1 with pits of recorded information, and a third cross section 7.

Once data is fully recorded the OD master is completed in a fourth step by vacuum deposition 28, or other equivalent process, of a very thin, approximately 1000 angstroms (Å), electrically conductive and optically reflective lamina 30, which in the preferred embodiment is silver (Ag) FIG. 6 illustrates a top view of the tracks of recorded data along tracking grooves 12 indicated by ablated pits 24 which typically would be ¼ deep, 0.6 μm wide and 0.9 to 3.3 μm long representing data from 3 bits to 11 bits in CD formate or a single bit to multiple bits in an alternate format. FIG. 6 is actually a longitudinal view of FIG. 3 with data recorded.

Figure 7A:
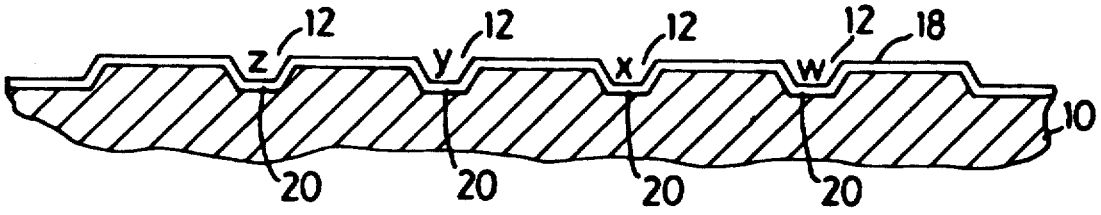
FIG. 7*a* illustrates a cross section of FIG. 6 before ablation f the active layer and before metalization, and corresponds to an end view of FIG. 5*a*.
Figure 7B:
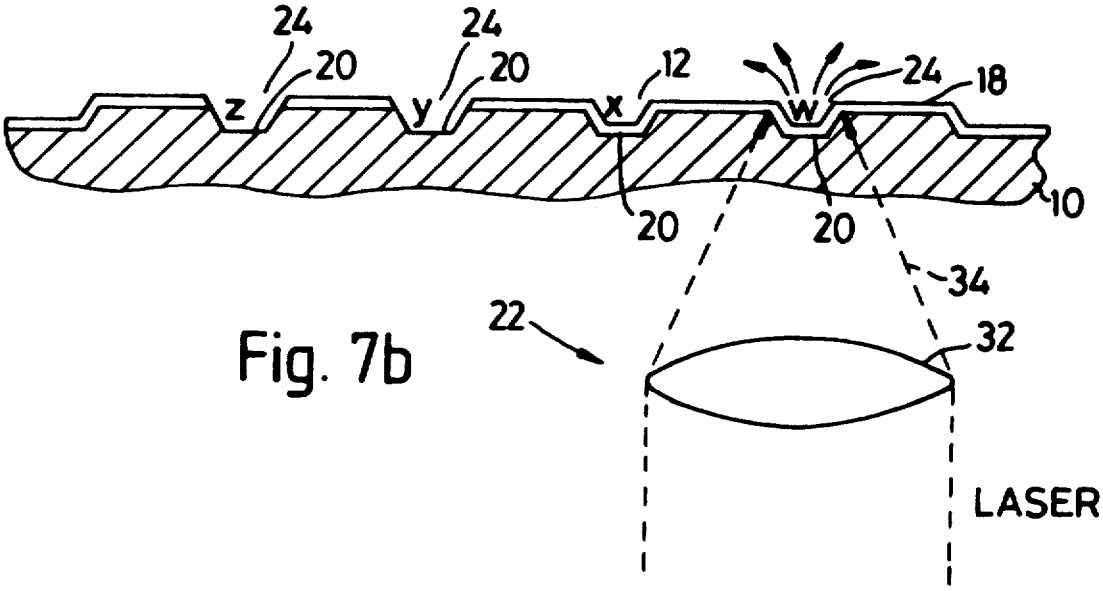
FIG. 7*b* illustrates a cross section of FIG. 6 during the process of recording data by ablation indicating ablated (z and y), non-ablated (x), and ablating pits (w), and corresponds to an end view of FIG. 5*b*.
Figure 7C:
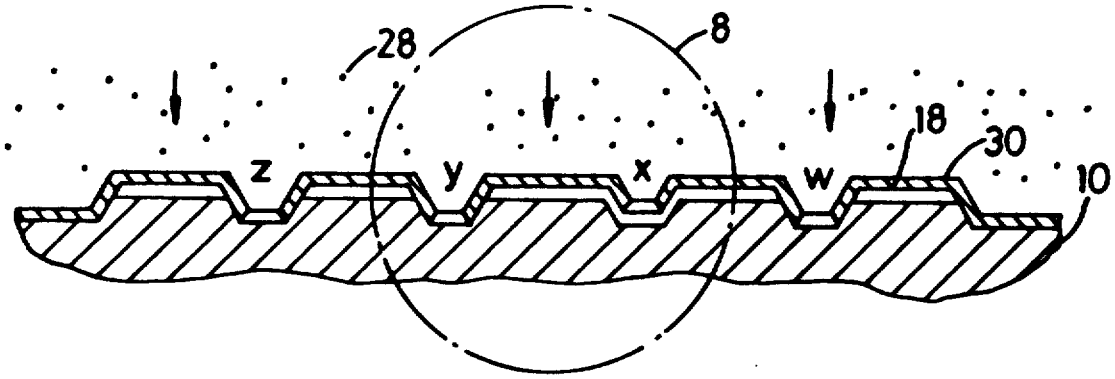
FIG. 7*c* illustrates the actual cross section of FIG. 6 after spin coating active lamina, recording on active lamina and metalization, and corresponds to an end view of FIG. 5*c*.

FIGS. 7*a*, 7*b* and 7*c* are provided as a developmental cross section of FIG. 6 in an effort to more clearly describe the processes taking place during formation of the OD master. FIG. 7*a* is actually FIG. 3 after an optically active lamina 18 has been applied to the grooved substrate 10 with grooves 12 and grooved surfaces 20 particularly and specifically labeled w, x, y and z. FIG. 7*b* illustrates a significant evolution in the OD mastering art, that of being able to accurately determine the geometry and ideal shape of each bit or bits of data recorded by optical means. Because the optically active lamina 18 of nitrocellulose, or any other optically active material that might be used for like purposes, spontaneously and rapidly reacts in a miniscule chemically explosive manner upon absorption of heat energy from the code modulated laser beam 34, it is customarily difficult to predetermine with exacting dimensions the nature and geometry of pits of data to be recorded in the master that will ultimately be duplicated many fold for mass distribution of OD's in a manner that data will always and invariably be recorded and reproduced in an exacting manner. The geometry and dimensions of grooves imprinted on the disc can indeed by determined to a great degree of accuracy by various means customary in the art, to include, among others, mechanical/physical etching, photo resist etching and even continuous ablation of a layer by means of a continuous wave (CW) laser beam. Therefor, by using the groove dimensions and geometry to be that of the pit/data geometry, the accuracy of recording and duplicating data is greatly enhanced. By total or partial ablation of pits of optically active lamina 18, leaving only the grooved walls 20 or a nominal residual active layer, the geometry of recorded data is thereby predetermined with great accuracy thereby eliminating variables in conventional pit formation due to variable or non-homogenous solutions of radiation absorbing dye solute in the nitrocellulose compound solvent which indeed may cause differing chemical reactions resulting in varying size and shape pits of data. Indeed even a variable thickness of optically active lamina 18 may cause a variation in pit 24 formation. However, by total or partial ablation f the optically active lamina 18 from the grooves 12 at points where data is to be recorded as pits 24, the boundaries and geometry of each pit is determined with as great deal of accuracy.

FIG. 7*b* illustrates the before (x), during (w) and after (y and z) process of recording data. In FIG. 7*b*, laser beam 34 is caused to focus by lens 32 upon the entire surface 20 of a point on groove 12 illustrated as "w" while tracking groove 12. When a bit of information is to be recorded, power of laser tracking beam 34, increases sufficient to cause an entire of partial ablation indicated by dotted surface 20 lines and emanating arrows. By such means, the optically active lamina 18 being nearly totally ablated, a pit 24 of information is formed with the exact of correlated dimensions of groove surface 20. Such is the cause in segment "z" and "y", reference FIG. 6, where data was recorded. It should be noted that at the point on segment "x" of groove 12 where data was not recorded, reference FIG. 6, the optically active lamina 18 remains intact as desired.

Figure 5C:
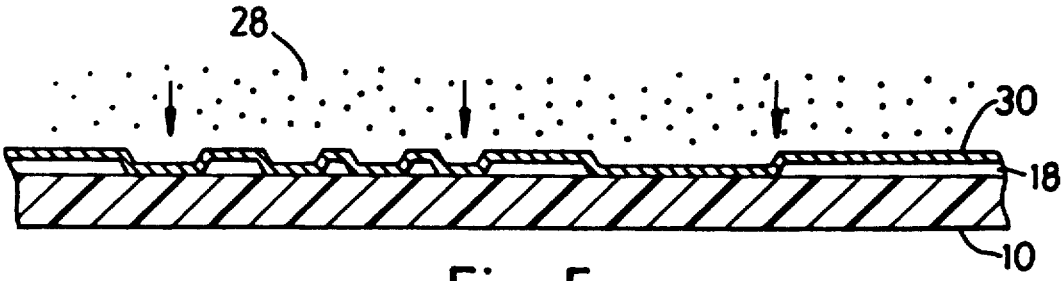
FIG. 5*c* illustrates the FIG 4 cross section depicting the formation of the reflective and conductive lamina by vacuum deposition, i.e. the metalization process (Step 4).

FIG. 7*c* is provided as the actual cross section of FIG. 6 after spin coating active layer 18, after data is recorded therein, and during the metalization process described in FIG. 5*c*.

Figure 8:
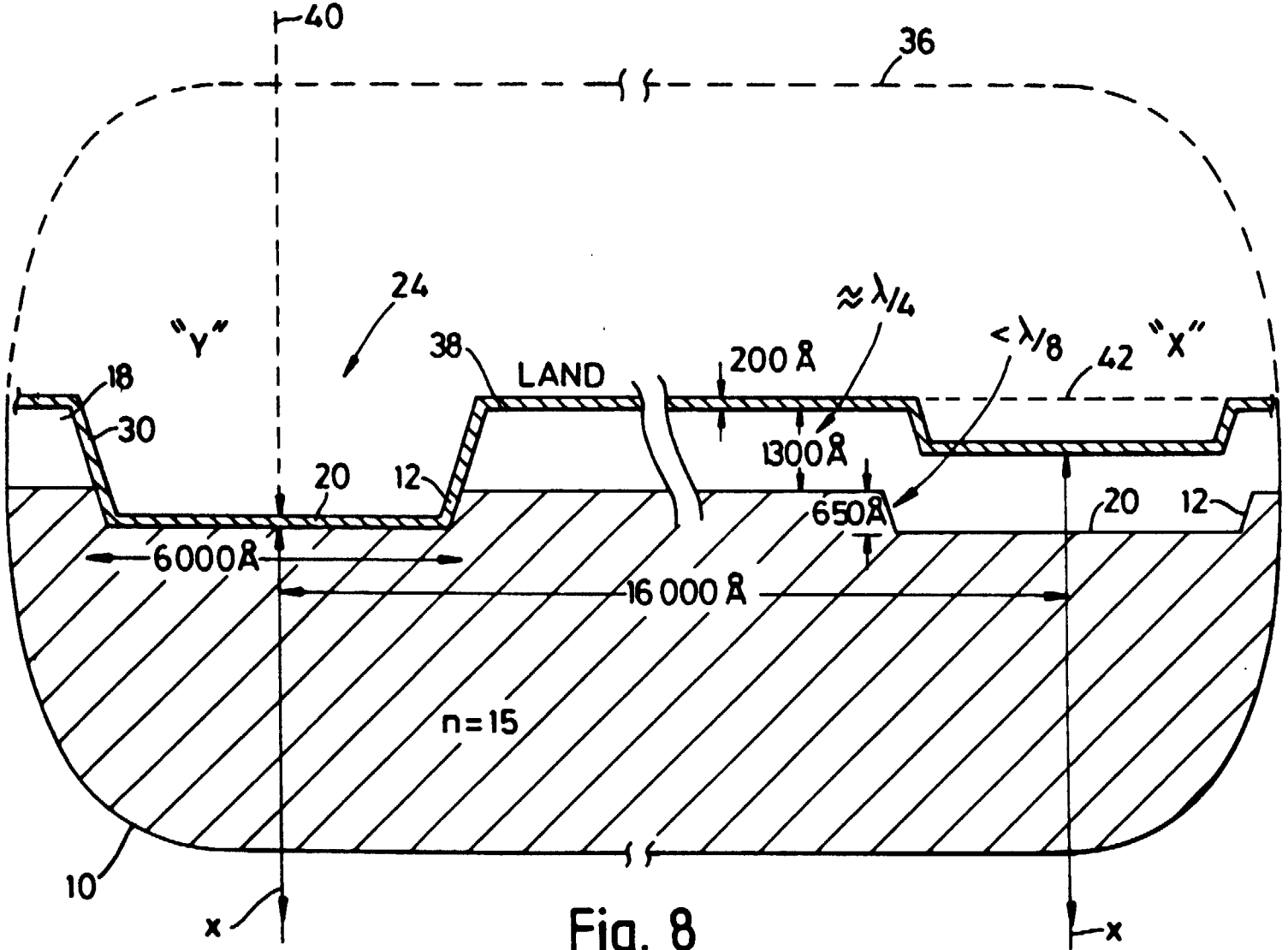
FIG. 8 illustrates a blown up detail of FIG. 7*c* depicting the physics/optics and relative dimensions of an ablated (y) and non-ablated (x) groove.

Referring now to FIG. 8, an enlarged section of FIG. 7*c* is illustrated to both briefly explain the optics conventionally utilized in reading at a archieved or recorded upon an OD reproduced from an OD master disclosed herein, conventionally referred to as WORM (Write Once Read Many) and also to disclose a variation of and added embellishment of the invention.

FIG. 8, without dashed line 36, illustrates detail of an OD master product of the invention process taught by this disclosure. The master when finished comprises a pregrooved transparent polymer substrate 10 having an optically active lamina 18 that has been totally or partially ablated at point "y" of groove 12 where a pit of data is recorded and yet unaffected on the "land" 38 (space between grooves) and at point "x" of groove 12 where no data is recorded, all of which is covered by an electrically conductive lamina 30. If a third protective layer 36 is applied to electrically conductive lamina 30 which is also optically reflective, e.g. silver (Ag) though not necessarily limited thereto, the OD master is effectively converted to an OD WORM with dimensions as indicated due to the index of refraction (1.5 ) of polymer substrate 10 through which laser beam 34 must pass to record and read data. All dimensions in FIG. 8 are given in angstroms ($10^{-10}$ meter) for ease of comparison of relative layers, excepting polymer substrate 10 which may typically be 1.2 mm and polymer protective layer 36 which is variable as desired but approximately 1 mm.

In making an OD master or OD WORM it is desirable that a pit of recorded information be in the realm of $\frac{1}{4}$ or approximately 1950 Å (actually 1300 Å in consideration of index of refraction, 1950/1.5=1300) with use of a 7800 Å laser in so doing, light traversing through a pit 24 distance would cover a reflected distance of $2\times\frac{1}{4}=\frac{1}{2}$ yielding a 180° phase difference between an incoming laser beam and the reflected beam, which in turn causes a destructive interference pattern that can be interpreted as data. Correspondingly, laser beam 34 not only records data in groove 12 but also tracks grove 12. For tracking purposes as at point "x" of groove 12, it is desirable that groove 12 and reflective lamina 30, be in the realm of $\frac{1}{8}$ or 975 Å (actually 650 Å, 975/1.5=650). Reflected laser beam 34 crossing a groove 12 distance would then cover a reflected distance $2\times\frac{1}{8}=\frac{1}{4}$ yielding a 90° phase difference of the reflected beam and therfore causing light dispersion which is interpreted as proper tracking.

It is conceived, therefore, that although the primary and significant intent of the foregoing mastering process is to make a master from which a conventional stamper may be made which will yield many duplicate copies of the master, nevertheless, it is also conceived that a WORM OD may be elected utilizing the same process and equipment by addition of a protective layer over a very thin optically active and reflecive/conductive laminae.

FIG. 8 also illustrates a Read While Write capability as another novel feature of applicant's invention. While a write laser beam 34 is recording data by active layer 19 ablation to form pit 24, a second read laser beam 40 antipodal to write beam 34 can be implemented to monitor ablation as it is occurring to form pit 24. Although ther would be no reflective layer 30 or protective layer 36 until after all data is recorded on the master or WORM, it will be appreciated that in addition to refractive and transmissive characteristics of polymer 10, there exists also limited reflective characteristics that can indeed be monitored by read beam 40. It is of little consequence, but should also be understood that normal read mode is beam 34 just as beam 34 is normal write made. Therefore, monitor beam 40 would be reading an inverted image of data written by beam 34. However, as pointed out supra, although less desirable the master could be made by using beam 40 as the recording beam which would likewise make beam 40 as the normal read mode. FIG. 8 discloses one additional feature of the invention. Dashed line 42 in the unrecorded "x" groove is included to illustrate a preferred though not necessarily fully achievable embodiment. As the optically active lamina 18 is spin coated upon pregrooved polymer substrate 10, lamina 18, being a liquid, tends to follow the contour of groove 12 on disc 10. Therefore, just as disc 10 surface 20 is grooved so too is active layer 18 and of course subsequently added conductive/reflective lamina 30. However, it is preferred that the active lamina 18 and superimposed conductive, reflective lamina 30 be level or lie in the same plane as the land area 38 as illustrated by dotted line 42. By such means better reproduction characteristics of a master and better reflective characteristics of a WORM could be achieved.

The laser 22 used in the foregoing process is preferably a 780 nm wavelength laser though not necessarily limited thereto mounted in an optical head which has a single spot tracking capability; it being understood that different laser wave lengths would dictate different groove and pit geometry. The optical head has a lens 32 with a numerical aperature of 0.6 such that the laser may be focused to a spot on tracking groove 12 which spot has a diameter approximately equal to the width, 0.6 μm, of the groove when laser beam 34 passes through polymer substrate 10. Once lens 32 is focused, optical tracking groove 12 provides a means by which laser 22 can track on disc 10 and follow the spiral path necessary for optical disc encoding. The operating system utilizes servo means conventional in the art to adjust the spinning disc 10 speed to the radial translational movement of optical head 22 in such fashion that laser beam 34 is able to follow the spiral groove 12 at a constant linear velocity (CLV) from the inner most groove radius (r') to the outermost grove radius (r").

The laser diode used in the invention is a diode having sufficient power to ablate the optically active lamina. The diode during recording is modulated with the desired data stream and by such means forms the series of ablated pits 25 of various length aligned along groove 12.

Upon completion of the metalization process of step 4, the resultant OD master can then be electroplated by means conventional in the art to form a stamper for replication of many identical discs. Alternatively, the thus produced master may be converted to a WORM by a simple application of a protective cover or layer to the reflective layer.

Although there has been described herein above a particular process for making an OD master and OD WORM for the purpose of illustrating a manner in which the invention may be used to advantage, it will be appreciated that the invention is not limited thereto. Accordingly, any and all modifications, variations, or equivalent arrangement of steps which may occur to one skilled in the art should be considered to be within the scope of the invention as defined in the appended claims.

What is claimed is:

1. A process for making an optical disc (OD) master from which an OD WORM may be made comprising the steps of:

making a disc substrate having an optical tracking path of a defined geometry delineated on one side of said substrate;

applying a homogeneous, optically active lamina to said path delinated side of said disc substrate;

optically writing data on said active lamina along said path in a series format of variable length bits, the geometry of said bits being substantially controlled and predetermined by the geometry of said path; and applying a conductive and optically reflective lamina to said active lamina.

2. A process according to claim 1, wherein said disc substrate is a polymer.

3. A process according to claim 1, wherein said tracking path is a spiral commencing at an inner radius and terminating at an outer radius.

4. A process according to claim 1, wherein said tracking path comprises a plurality of concentric circles having a common center at the center of said disc, commencing at an inner radius and terminating at an outer radius.

5. A process according to claim 1, wherein said tracking path is a groove.

6. A process according to claim 1, wherein data bits are optically written along said path by ablation of said active lamina forming a series of variable length pits.

7. A process according to claim 1, wherein said conductive, optically reflective lamina is metallic.

8. A process for making an OD master from which an OD stamper and an OD WORM may be made, comprising the steps of:

providing a disc substrate having an optical tracking path of a defined geometry delineated on one side of said substrate;

applying a homogeneous, optically active lamina to said path delineated side of said disc substrate;

optically writing encoded data on said active lamina along said path in a form substantially determined by the physical features of said path itself by laser means positioned on one side of said disc;

optically reading and monitoring accuracy of said encoded data by laser means positioned on the opposite side of said disc while said encoded data is being written; and applying a conductive and optically reflective lamina to said encoded active lamina.

9. A process for making an OD master from which an OD stamper and an OD WORM may be made, comprising the steps of:

making a disc substrate having an optical tracking path of a defined geometry delineated on one side of said substrate;

applying a homogeneous, optically active laminate to said path delineated side of said disc substrate;

optically writing data on said active lamina along said path in a series format of variable length bits, the geometry of said bits being substantially controlled and predetermined by the geometry of said path;

applying a conductive and optically reflective lamina to said active lamina forming an OD master; and applying a protective coating to said conductive/reflective lamina forming an OD WORM.

*10. An optical disc structure useful for recording an optical disc master from which an optical disc stamper can be made, comprising:*

*a flat, planar substrate having an outer peripheral portion;*

*a first surface of said substrate having an optical tracking path delineated thereon, said tracking path having characteristics that are essentially identical throughout said tracking path; and*

*radiation sensitive and ablative lamina means responsive to radiation of a predetermined characteristic deposited on said first surface for optically recording data modulated information in a series of pits within said lamina means in response to radiation of said predetermined characteristic being incident said first surface.*

*11. The disc defined by claim 10 further comprising:*

*said tracking path having a predetermined size and shape including opposed spaced facing side walls and a base between said side walls designed to accommodate creating a pit within said lamina contained within said tracking path using the geometry of said path to assist in controlling the size of said pits; and*

*whereby, exposure of said tracking path to radiation of said predetermined characteristic creates a pits recorded data that can be used as an optical disc master.*

*12. The disc of claim 10 wherein said predetermined characteristics consists of an infa red wavelength and said radiation sensitive and ablative lamina means contains an ablative dye that is optically active in response to infa red light; and*

*whereby, upon exposure of said surface to light of said predetermined characteristics generates heat of sufficient portions to ablate a portion of said lamina thereby making a recording pit.*

*13. The disc of claim 10 wherein said substrate consists of a material that is transparent to radiation of said predetermined characteristics.*

*14. The disc of claim 10 wherein said substrate is comprised of a material that is opaque to radiation of said predetermined characteristics.*

*15. A process for making an optical disc (OD) master from which an optical disc stamper can be made comprising the steps of:*

*manufacturing an optical disc substrate having a surface with an optical tracking path of defined geometry delineated on said surface;*

*applying to said surface, optically active means sensitive to radiation of an predetermined wavelength for forming pits having a size and shape that can be reproduced by an electroforming process;*

*optically writing data along said path by irradiating said optically active means within said path with radiation having said predetermined wavelength to form a series pits within said path.*

*16. The process of claim 15 further including making an optical disc stamper by applying a conductive lamina to said surface to form a negative of said pitted surface and removing said conductive lamina to form said stamper.*

*17. The process according to claim 15, wherein said disc substrate is transparent and said step of optically writing comprises focusing a laser through said transparent substrate and upon said optically active means within said optical tracking path delineated on said surface.*

*18. The process according to claim 15 wherein said optically active means consists of a lamina sensitive to infa red light.*

*19. The process according to claim 15 wherein said optical tracking path is a spiral groove.*

*20. The process according to claim 15 wherein said optical tracking path is a set of concentric circles.*

*21. A process for making an optical disc (OD) master comprising the steps of:*

*manufacturing a transparent optical disc substrate having a recording surface;*

*applying to said surface, a homogeneous layer of an optically active lamina;*

*optically writing data on said surface by focusing laser means through said transparent optical disc substrate from a side opposite said recording surface.*

*22. A process according to claim 21, wherein said manufacturing step further comprises manufacturing an optical disc substrate containing an optical tracking path delineated on said recording surface, said tracking path consisting of radially spaced groove portions defining a land area between said radially spaced grooved portions.*

*23. A process according to claim 22 wherein said series of data pits are formed within said tracking path.*

*24. A process according to claim 22 wherein said series of data pits are formed within said land area.*

*25. A process according to claim 22, wherein said tracking path consists of a V shaped groove.*

*26. A process according to claim 22 wherein said optical tracking path is a spiral commencing at an inner radius and terminating at an outer radius.*

*27. A process according to claim 22, wherein said tracking path comprises a plurality of concentric circles having a common center at the center of said disc, commencing at an inner radius and terminating at an outer radius.*

*28. A process according to claim 22, wherein said tracking path consists of a pair of spaced side walls separated by a base.*

*29. A process to claim 21 further comprising the steps of:*

*forming a conductive lamina upon said recording surface; and*

*removing said conductive lamina to form an optical disc stamper.*

*30. A process according to claim 21, wherein said manufacturing step further consists of a using a polymer as said substrate.*

*31. A process according to claim 21, wherein said manufacturing step further consists of using a glass as said substrate.*

*32. A process according to claim 31 wherein said data pits form a continuous path containing said series of pits in adjacent radially spaced grooves portions.*

*33. The invention according to claim 32 further comprising reading and monitoring said series of pits by laser means.*

*34. The process according to claim 33 further comprising making an optical disc stamper by applying a conductive lamina to said recording surface and removing said conductive lamina to make said stamper, therefrom.*

*35. A process for making an optical disc master from which an optical disc stamper can be made comprising the steps of:*

*providing a disc substrate having an optical tracking path of a defined geometry delineated on one side of said substrate;*

*applying a homogeneous, optically active lamina to said path delineated side of said disc substrate;*

*optically writing encoded data on said active lamina along said path by laser means focused on said active lamina to form a series of pits; and*

*optically reading and monitoring accuracy of said encoded data by laser means focused on said series of pits while said encoded data is being written.*

*36. A process according to claim 35 further comprising the steps of:*

*applying a conductive lamina to said encoded active lamina; and*

*removing said conductive lamina to form an optical an optical disc stamper therefrom.*

*37. A process according to claim 35 wherein said series of data pits are formed within said tracking path.*

*38. A process according to claim 35 wherein said series of data pits are formed within a land area defined by said tracking path.*

*39. A process according to claim 35 wherein said optical disc substrate is transparent.*

*40. A process according to claim 39, wherein the step of optically writing data pits comprises focusing laser means through said transparent optical disc substrate from a side opposite said recording surface.*

*41. A recorded optical disc product used for making optical disc masters made from the process of:*

*making an optical disc substrate having a recording surface with an optical tracking path of a defined geometry delineated on said recording surface;*

*applying a homogeneous, optically active lamina to said path delineated surface of said disc substrate; and*

*optically writing encoded data as a series of pits on said surface along said path, said pits having their geometry substantially controlled by the dimensions of said path.*

*42. A product for optical disc stampers according to claim 41 further comprising the process steps of:*

*applying a conductive lamina over said surface containing said pits such that said conductive lamina conforms to the shape of said surface containing said series of pits and forms a negative pattern thereof; and*

*removing said conductive lamina containing said negative pattern of said pitted surface to form said stamper, therefrom.*

*43. A recorded disc product used for making optical disc masters made from the process of:*

*making a transparent optical disc substrate having a recording surface on one side;*

*applying a homogeneous, optically active lamina to said recording; and*

*optically writing data on said recording surface as a series of pits on said surface, radially spaced from the center of said disc, by focusing laser means through said substrate from an opposite side from that containing said recording surface.*

*44. The product for optical disc masters according to claim 43 further comprising reading and monitoring said series of radially spaced pits by laser means.*

*45. A product for optical disc stampers according to claim 43 further comprising the process steps of:*

*applying a conductive lamina over said surface containing said pits such that said conductive lamina conforms to the shape of said surface containing said series of pits and forms a negative pattern thereof; and*

*removing said conductive lamina containing said negative pattern of said pitted surface to form said stamper, therefrom.*

* * * * *